UNITED STATES PATENT OFFICE.

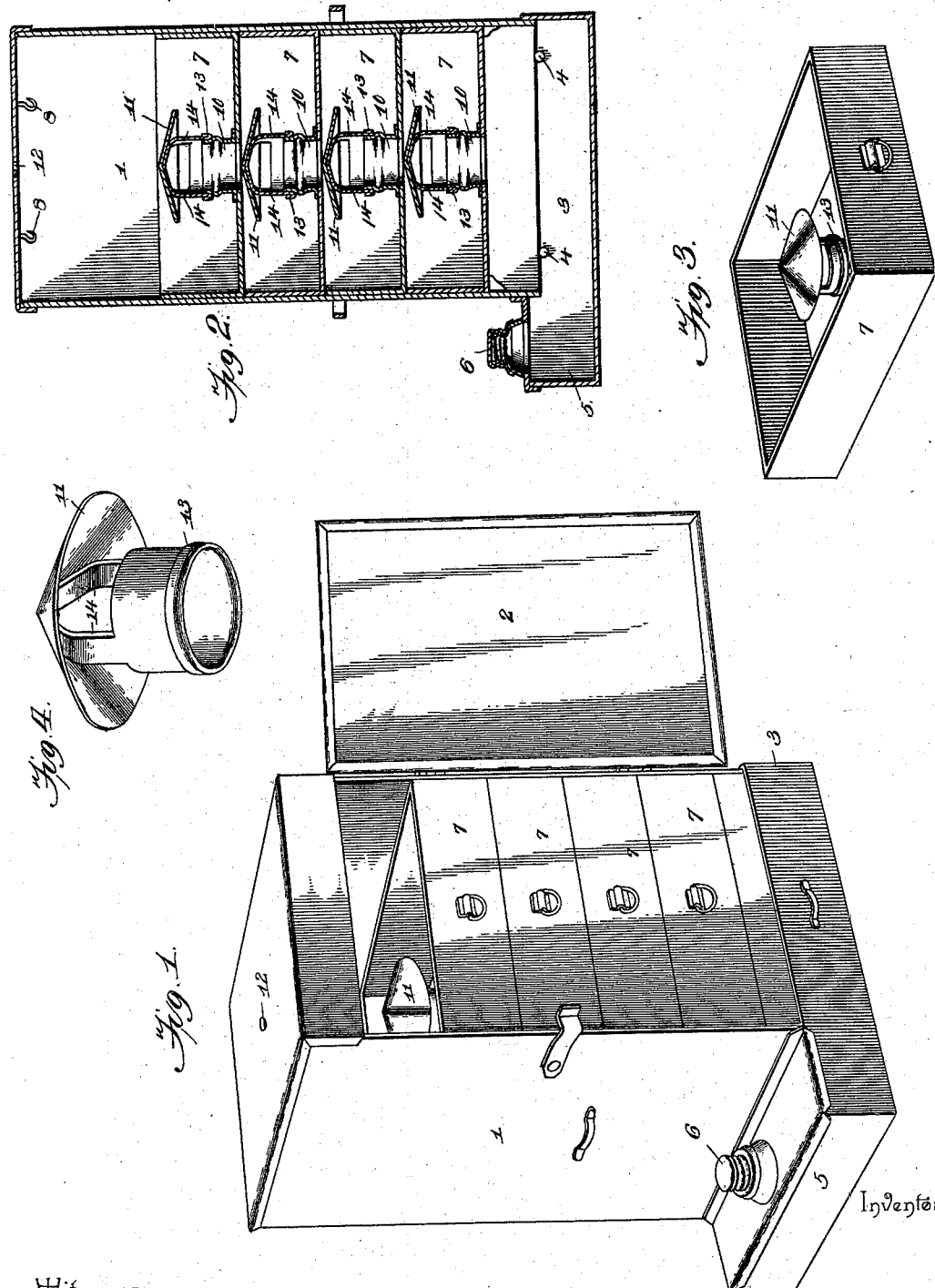

JAMES W. LEE, JR., OF MEXICO, MISSOURI.

STEAM-COOKER.

SPECIFICATION forming part of Letters Patent No. 559,137, dated April 28, 1896.

Application filed February 27, 1895. Serial No. 539,914. (No model.)

*To all whom it may concern:*

Be it known that I, JAMES W. LEE, Jr., a citizen of the United States, residing at Mexico, in the county of Audrain and State of Missouri, have invented a new and useful Steam-Cooker, of which the following is a specification.

The invention relates to improvements in steam-cookers.

The object of the present invention is to provide a simple and inexpensive steam-cooker adapted for cooking all kinds of meats and vegetables and capable of being readily supplied with the necessary water for the generation of steam without interfering with the contents of the casing or oven.

A further object of the invention is to provide such a cooker which will be adapted to receive a series of pans to enable a number of different articles to be simultaneously cooked, and which will permit any one of the pans to be inspected or removed without necessitating the previous removal of the pans above the one being inspected.

The invention consists in the construction and novel combination and arrangement of parts hereinafter fully described, illustrated in the accompanying drawings, and pointed out in the claim hereto appended.

In the drawings, Figure 1 is a perspective view of a steam-cooker constructed in accordance with this invention. Fig. 2 is a central vertical sectional view. Fig. 3 is a detail perspective view of one of the pans. Fig. 4 is a similar view of one of the removable deflectors detached.

Like numerals of reference indicate corresponding parts in all the figures of the drawings.

1 designates a rectangular casing, forming an oven and provided with a door 2 and mounted on a steam-generator 3, designed to be placed upon a stove or other heating apparatus and adapted to contain water for the generation of steam. The bottom of the oven is open, and the steam-generator, which is rectangular, is provided at its top with an opening, receiving the lower end of the oven or casing. The oven or casing, which is mounted upon the generator, is supported by any suitable means, preferably by inwardly-projecting studs 4, arranged in pairs at opposite sides of the generator.

The steam-generator is provided with a covered extension 5, having a filling opening or orifice receiving a screw-cap 6 and permitting the generator to be inspected and to be supplied with water from time to time without disturbing the contents of the oven or in any wise interfering with the operation of cooking.

The oven receives a vertical series of pans 7, which are rectangular, conforming to the configuration of the casing or oven, the door being of the entire width of the casing and the pans resting against the sides thereof and being of the same horizontal area. The pans may be of any desired number, and in cooking one or more may be employed, as will be found necessary, and the oven or casing is provided at its top with hooks or hangers 8, from which may be suspended large articles, such as turkeys, chickens, roasts, and the like, the requisite number of pans being of course removed to provide a space for cooking such articles. Each pan is provided with a central vertical tube 10, forming a passage for the steam, which enters the lowermost pan first, and mounted on the tube 10 is a substantially conical deflector or hood, located a sufficient distance above the upper end or mouth of the tube to provide an escape for the steam and adapted to have the same impinge against its lower face, whereby the steam is directed upon the contents of the pan equally and insuring a uniformity in the cooking. The steam passes upward through a series of pans, and a small opening 12 is provided at the top of the oven for its escape. The deflector or hood 11 is detachably connected with the tube 10 by a ring or band 13, provided with upwardly-extending arms 14, secured to the lower face of the deflector. One or more of the deflectors or hoods may be removed from the series of pans to cause the steam to pass directly through the pan instead of being deflected upon its contents, if desired, and this will enable the contents of a pan to be warmed without being cooked or steamed to any great extent.

The casing, pans, and steam-generator may be constructed of any suitable material, such as sheet metal, and are provided with suitable handles.

It will be seen that the steam-cooker is exceedingly simple and inexpensive in construction, that it is adapted to be readily handled, that the contents of the oven may be conveniently examined or removed, and that the condition of the steam-generator may be ascertained and water supplied without removing the oven or interfering with the operation of cooking. It will also be apparent that by providing the door at one side of the oven any one of the pans may be removed without first removing those above it, that would be necessary were the pans placed in the oven at the top instead of at the side.

Changes in the form, proportion, and the minor details of construction may be resorted to without departing from the principle or sacrificing any of the advantages of this invention.

What I claim is—

A steam-cooker, comprising a steam-generator, an oven mounted thereon, a vertical series of pans arranged within the oven and provided with corresponding upwardly-extending tubes terminating short of the adjacent pan, and a series of conical deflectors located above the upper ends of the tube and adapted to prevent a direct upward passage of steam through the several tubes to deflect the steam upon the contents of the pans, said deflectors being detachably secured to the tubes, whereby one or more of the deflectors may be removed to permit a direct upper passage of steam through one or more pans, substantially as and for the purpose described.

In testimony that I claim the foregoing as my own I have hereto affixed my signature in the presence of two witnesses.

JAMES W. LEE, JR.

Witnesses:
HARRY ATCHISON,
T. J. WILLIAMS.